(12) United States Patent
Yoshikawa et al.

(10) Patent No.: US 7,622,841 B2
(45) Date of Patent: Nov. 24, 2009

(54) MOTOR

(75) Inventors: Yuichi Yoshikawa, Osaka (JP); Hiroki Sato, Fukui (JP); Yasushi Kamada, Fukui (JP); Hiroshi Murakami, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 11/756,206

(22) Filed: May 31, 2007

(65) Prior Publication Data

US 2007/0222319 A1 Sep. 27, 2007

(51) Int. Cl.
*H02K 21/12* (2006.01)

(52) U.S. Cl. .................................. 310/156.53

(58) Field of Classification Search ................................. 310/156.01–156.84
See application file for complete search history.

(56) References Cited

U.S. PATENT DOCUMENTS 5,864,191 A * 1/1999 Nagate et al. .......... 310/156.54
6,794,784 B2 * 9/2004 Takahashi et al. ...... 310/156.56
2004/0007930 A1 * 1/2004 Asai et al. .............. 310/156.53

FOREIGN PATENT DOCUMENTS

JP 11-191939 A 7/1999
JP 2002-359942 * 5/2002

* cited by examiner

*Primary Examiner*—Nguyen N Hanh
(74) *Attorney, Agent, or Firm*—RatnerPrestia

(57) ABSTRACT

A motor includes a stator and a rotor. The stator is configured by winding a coil around a stator core which includes a salient-pole core. The rotor has a rotor core made by laminating thin and highly permeable iron sheets. The rotor core has multiple permanent magnet embedding holes, and a permanent magnet is embedded in each of the permanent magnet embedding holes. A cross-section of the permanent magnet is a rectangle with a long side in a rotating direction and a short side perpendicular to the long side. A cross section of the permanent magnet embedding hole is formed by an embedding hole's long side corresponding to the long side and an embedding hole's short side corresponding to the short side. The embedding hole's short side has a first protrusion and a flat portion. The embedding hole's long side to an inner diameter side has a second protrusion on its both ends.

9 Claims, 6 Drawing Sheets

MOTOR

BACKGROUND OF THE INVENTION

1. Field of the Invention

The present invention relates to magnet-embedded motors, in which a magnet is embedded in a rotor, used as synchronous motors or brushless motors.

2. Background Art

In conventional magnet-embedded motors, adhesive is applied to a permanent magnet, which is then inserted into a rotor core, for attaching the permanent magnet inside the rotor core. One example of the prior art is disclosed in Japanese Patent Unexamined Publication No. H11-191939.

However, the prior art has a drawback of an increased number of steps in design and production due to the need to control the moisture-resistance and viscosity of the adhesive. In addition, the use of adhesives increases the cost. Furthermore, since a slight clearance is required between the permanent magnet and the permanent magnet embedding hole to carry the adhesive, valid magnetic flux generated at the rotor core is reduced, resulting in reduced torque.

To solve the above disadvantages, the development of a magnet-embedded motor in which the permanent magnet is fixed inside the rotor core without using adhesive has been studied.

FIGS. 5A and 5B and FIG. 6 are magnified views of the permanent magnet and the permanent magnet embedding hole in the rotor core in a conventional magnet-embedded motor.

In FIG. 5A, permanent magnet embedding hole 112 has a minimum clearance with embedded permanent magnet 114. Clearance 115 at both ends in the longer direction is set at the minimum required clearance. Accordingly, permanent magnet 114 can be held inside permanent magnet embedding hole 112 without using adhesive. However, since permanent magnet 114 is magnetized as shown in FIG. 5A, short-circuiting magnetic flux 120 increases. This reduces valid magnetic flux passing to the stator, and thus reduces torque.

In FIG. 5B, permanent magnet embedding hole 113 has a minimum clearance in the shorter direction with embedded permanent magnet 114, and a larger clearance in the longer direction. In other words, permanent magnet embedding hole 113 has a larger clearance 115 at both ends of its long side. This reduces flux short-circuit compared to the case shown in FIG. 5A. However, permanent magnet 114 will move inside permanent magnet embedding hole 113 if adhesive is not used. Accordingly, permanent magnet 114 hits an inner side of permanent magnet embedding hole 113 when the motor is accelerated or decelerated. This may crack or chip the permanent magnet, and also generate noise.

Accordingly, the shape of permanent magnet embedding hole 212 shown in FIG. 6 has been proposed. This permanent magnet embedding hole 212 has protrusion 215 outward from both ends of the long side. This protrusion has a shorter width than the short side of permanent magnet 214. Both ends of the long side to the inner periphery side and protrusion 215 are connected by arc-shaped fillet 217. When rectangular parallelepiped permanent magnet 214 is inserted into permanent magnet embedding hole 212 with this shape, a tip of permanent magnet 214 to the inner periphery side contacts fillet 217. This enables suppression of any movement of permanent magnet 214 during acceleration and deceleration of the motor. At the same time, flux short-circuit, as the case shown in FIG. 5A, can be reduced.

However, with this shape of permanent magnet embedding hole 212, an end of permanent magnet 214 makes a line contact with the inner face of permanent magnet embedding hole 212, and thus the grip on permanent magnet 214 is insufficient. If sudden acceleration or deceleration of the motor takes place, movement of permanent magnet 214 inside permanent magnet embedding hole 212 cannot be completely suppressed.

SUMMARY OF THE INVENTION

A motor of the present invention includes a stator and a rotor. The stator is configured by winding a coil around a stator core which includes a salient-pole core and a yoke. The rotor has a rotor core made by laminating thin and highly permeable iron sheets, and is rotatably held facing an inner periphery of the salient-pole core via a gap. The rotor core has multiple permanent magnet embedding holes, and a permanent magnet is embedded in each of the permanent magnet embedding holes. A cross section of the permanent magnet is a rectangle with a long side in a rotating direction and a short side perpendicular to this long side. A cross section of the permanent magnet embedding hole is formed by an embedding hole's long side corresponding to the long side and an embedding hole's short side corresponding to the short side. The embedding hole's short side has a first protrusion and a flat portion. A second protrusion is provided on both ends of the embedding hole's long side to an inner diameter side.

With this structure, the permanent magnet is firmly held inside the permanent magnet embedding hole without the need to use adhesive. Cracking, chipping, and noise generation caused by the permanent magnet hitting a side wall of the permanent magnet embedding hole are thus preventable, even if the motor is suddenly accelerated or decelerated.

DETAILED DESCRIPTION OF THE INVENTION

Exemplary embodiments of the present invention are described below with reference to drawings.

First Exemplary Embodiment

Figure 1:
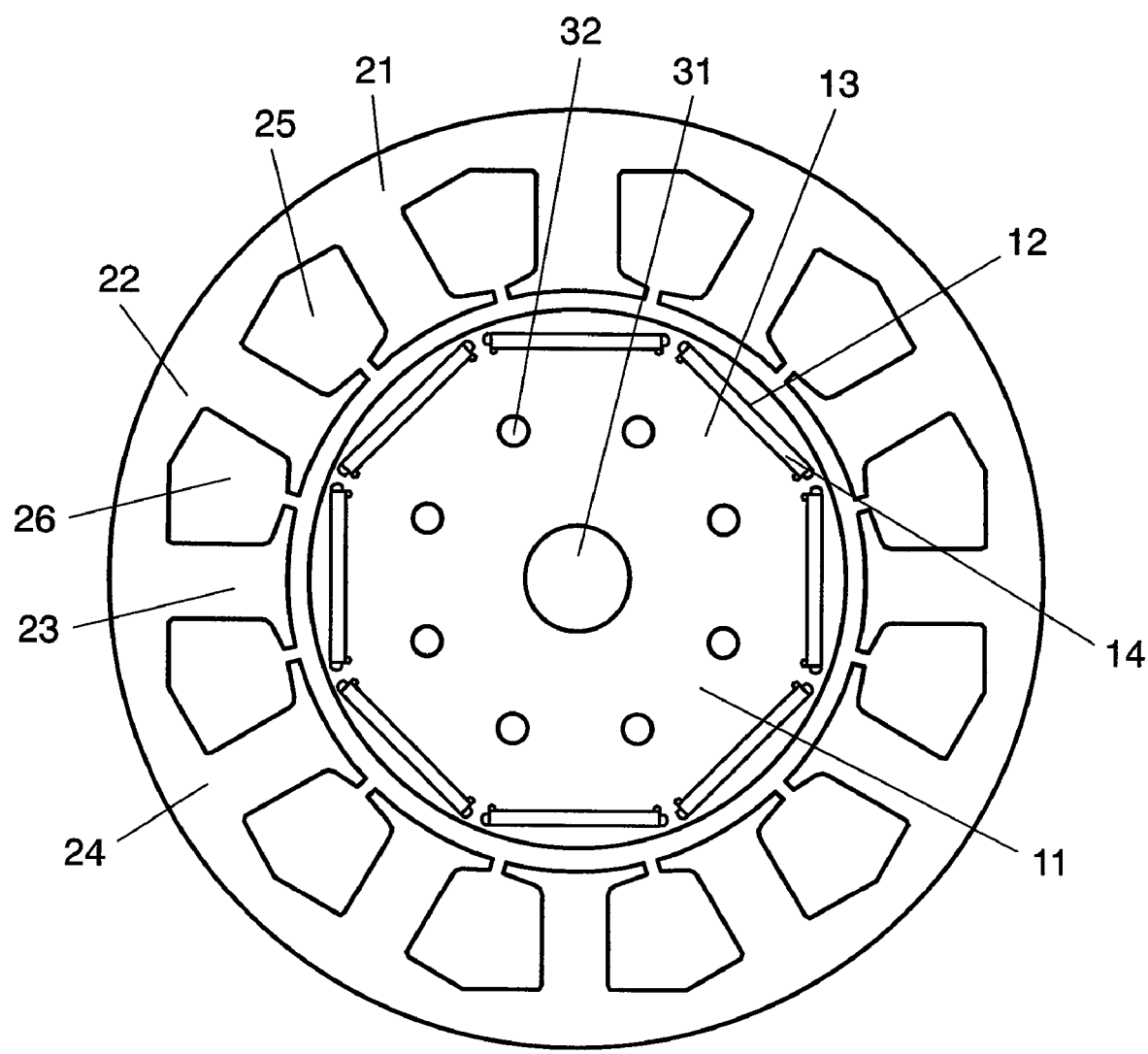
FIG. 1 is a sectional view of a motor in accordance with a first exemplary embodiment of the present invention.

FIG. 1 is a sectional view of a motor in the first exemplary embodiment of the present invention. In FIG. 1, stator 21 is configured by winding coil 26 around stator core 24 which is made by laminating multiple thin and highly permeable iron sheets punched by a press. This stator core 24 has slot 25 surrounded by yoke 22, salient-pole core 23, and adjacent salient-pole core 23. Coil 26 is wound around this stator core 24, adopting concentrated winding, and housed inside slot 25.

Rotor 11 includes rotor core 13, permanent magnet 14 housed in and held by permanent magnet embedding hole 12, and end plate (not illustrated) disposed at both axial ends. Rotor core 13 is made by axially laminating multiple thin and highly permeable iron sheets which have permanent magnet embedding hole 12 for housing the permanent magnet. The end plate and rotor core 13 are coupled by means of caulking pin 32. Rotating shaft 31 is tightened at the center of rotor core 13, and rotating shaft 31 is rotatably supported by bearings (not illustrated). Rotor 11 as configured above faces an inner periphery of salient-pole core 23 of stator 21 via an air-gap.

In FIG. 1, the rotor has eight poles (four pairs of poles), and there are twelve slots in the stator. However, it is apparent that the present invention is not limited to this combination. Other combinations are also applicable.

Figure 2:
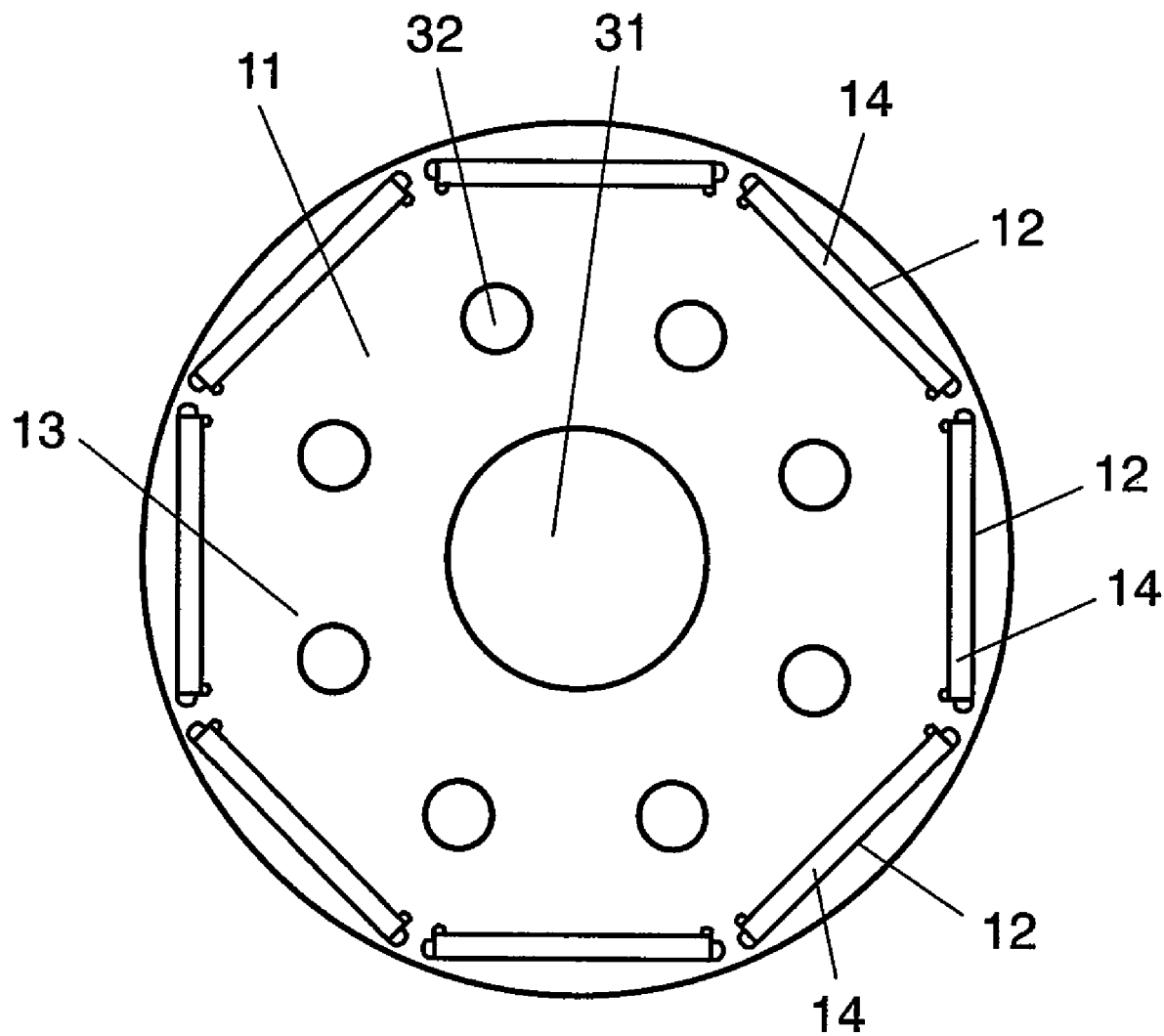
FIG. 2 is a sectional view of a rotor of the motor in accordance with the first exemplary embodiment of the present invention.
Figure 3:
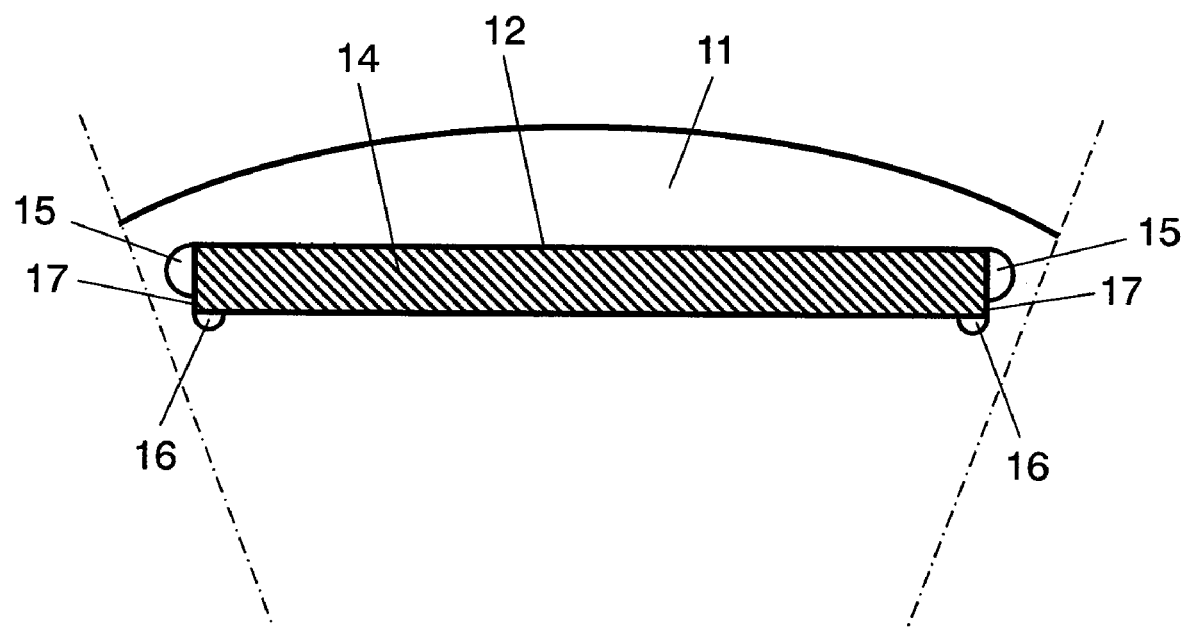
FIG. 3 is a fragmentary sectional view magnifying a part of the rotor of the motor in accordance with the first exemplary embodiment of the present invention.

FIG. 2 is a sectional view of rotor 11 of the motor in the first exemplary embodiment of the present invention. FIG. 3 is a fragmentary sectional view magnifying a part of rotor 11 of the motor in the first exemplary embodiment of the present invention.

Permanent magnet 14 is formed in rectangular parallelepiped shape. Its cross section is a rectangle with a long side in the rotating direction and a short side perpendicular to the long side. This is because a motor of rectangular parallelepiped shape can show a greater magnetic characteristic than motors of cylindrical shape, tile shape, or C-shaped cross section. The unit price per gram is also lower.

In FIG. 3, a cross section of permanent magnet embedding hole 12 is formed by an embedding hole's long side corresponding to the long side of permanent magnet 14, and an embedding hole's short side corresponding to the short side of permanent magnet 14. The embedding hole's short side has substantially semicircular first protrusion 15 protruding outward, followed by flat portion 17 which is linear and perpendicular to the embedding hole's long side.

The length of this flat portion 17 is set at a ratio from 0.2 to 0.6 of the length of the short side of permanent magnet 14. Accordingly, the diameter of semicircular first protrusion 15 becomes a ratio from 0.4 to 0.8 of the length of the short side of permanent magnet 14. In other words, the embedding hole's short side consists of first protrusion 15 and flat portion 17, and the length of flat portion 17 is preferably a little shorter than the diameter of protrusion 15.

The embedding hole's long side to the inner diameter side has substantially semicircular second protrusion 16 on both its ends, protruding toward the inner diameter. A diameter of semicircular shape of this second protrusion 16 is slightly smaller than the diameter of the semicircular shape of first protrusion 15.

This second protrusion 16 is preferably provided at both ends of the embedded hole's long side. The reason is the following. When a thin and highly permeable iron sheet is punched by a press, a shape is generally configured with lines and arcs to avoid creating a corner on the press die. If the press die has a corner, the force is concentrated on this corner at one point during punching by the press. This hinders accurate punching of the iron sheet. If protrusion 16 is provided on an inner position from both ends of the embedded hole's long side, a corner exists between the embedding hole's short side and long side, causing an inability to accurately punch the iron sheet.

The shape of first protrusion 15 and second protrusion 16 is not limited to semicircular. Other shapes such as oval protrusions are also applicable.

Rectangular parallelepiped-shaped permanent magnet 14 is inserted into permanent magnet embedding hole 12 as described above. Permanent magnet embedding hole 12 is designed such that the clearance with embedded permanent magnet 14 is the minimum possible. In other words, the length of the long side of permanent magnet 14 is almost the same as the distance between both flat portions 17 of permanent magnet embedding hole 12, leaving minimum clearance. The length of the short side of permanent magnet 14 is set almost identical to the linear length of the short side of permanent magnet embedding hole 12, leaving minimum clearance. Since flat portion 17 with aforementioned predetermined length is provided on the short side of permanent magnet embedding hole 12, permanent magnet 14 makes an area contact with this flat portion 17 and the embedding hole's long side. This allows reliable holding of permanent magnet 14.

Accordingly, permanent magnet 14 is firmly held in permanent magnet embedding hole 12 without the need to use adhesive. Cracking, chipping, and noise generation caused by permanent magnet 14 hitting the side wall of permanent magnet embedding hole 12 are thus preventable, even if the motor is suddenly accelerated or decelerated.

Second Exemplary Embodiment

Figure 4A:
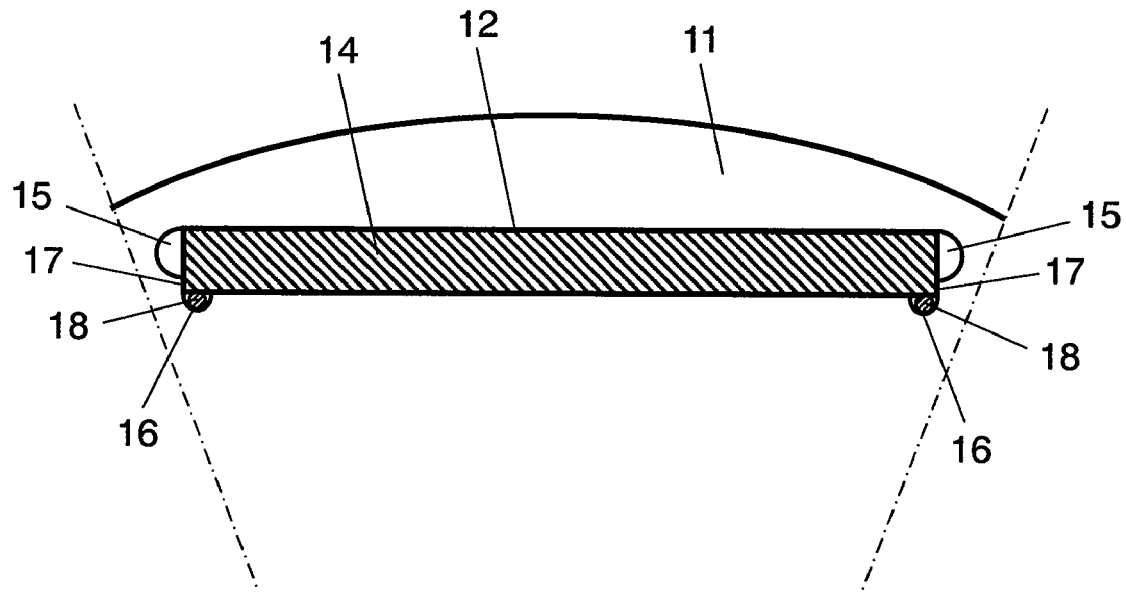
FIGS. 4A and 4B are fragmentary sectional views magnifying a part of a rotor of a motor in accordance with a second exemplary embodiment of the present invention.
Figure 4B:
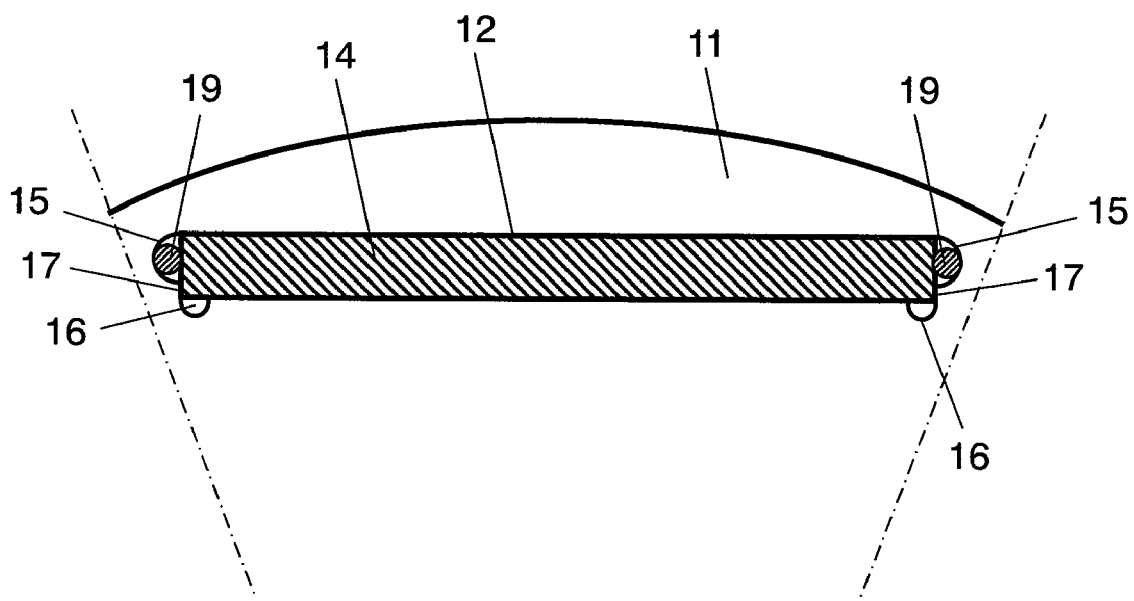
Figure 5A:
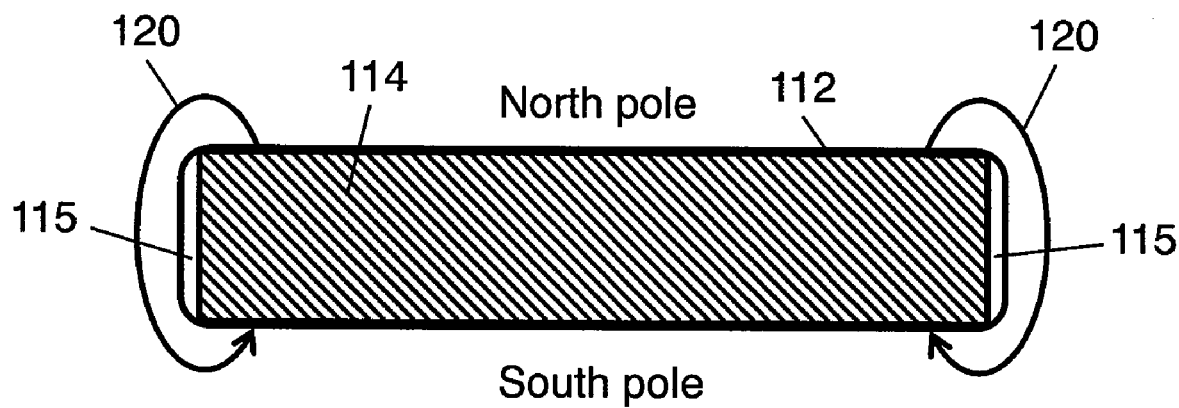
FIGS. 5A and 5B show a permanent magnet and permanent magnet embedding hole in a conventional motor.
Figure 5B:
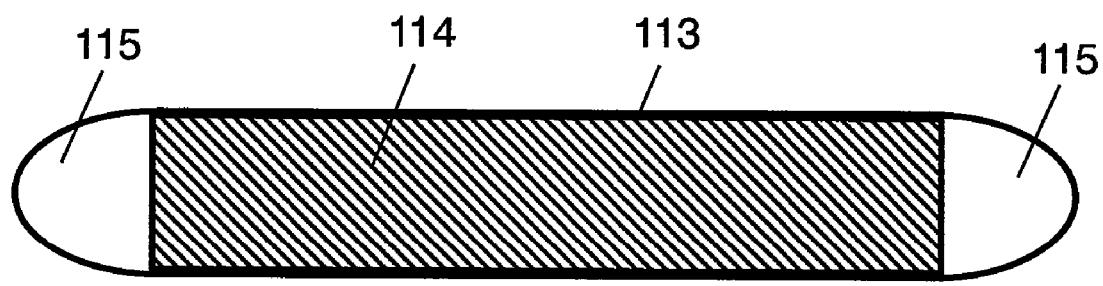
Figure 6:
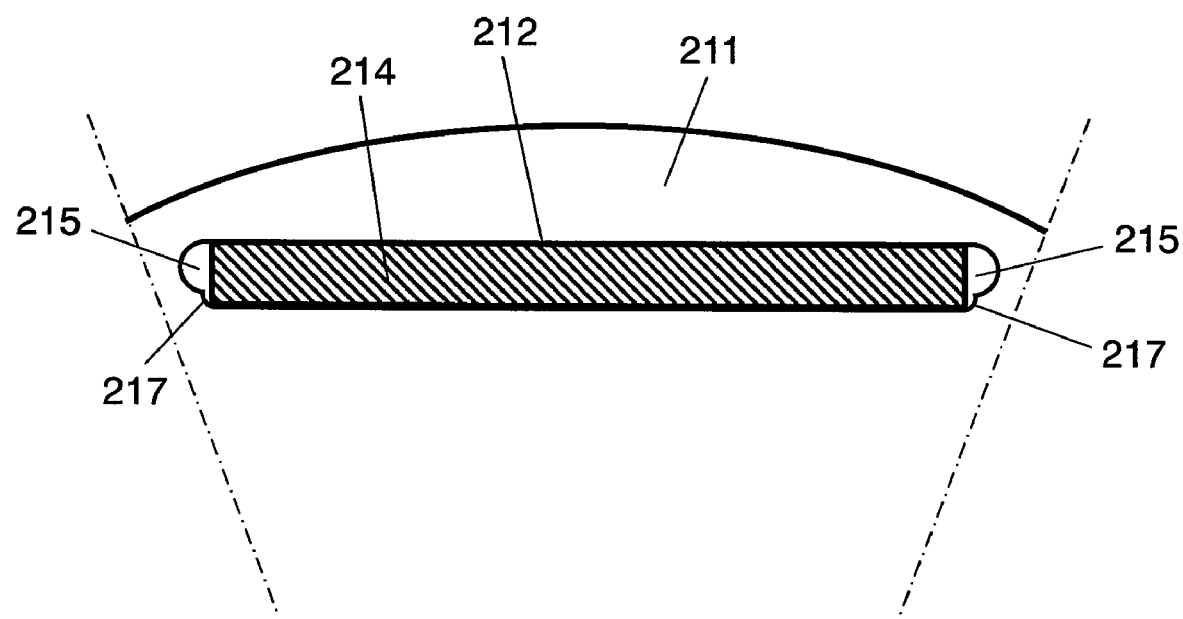
FIG. 6 is a fragmentary sectional view magnifying a part of a rotor of the conventional motor.

FIGS. 4A and 4B are fragmentary sectional views magnifying a part of rotor 11 of a motor in the second exemplary embodiment of the present invention.

Rotor 11 which configures the motor in the second exemplary embodiment includes permanent magnet 14 and permanent magnet embedding hole 12 same as those described in the first exemplary embodiment. In addition, cushioning material 18 is provided in second protrusion 16 of permanent magnet embedding hole 12, as shown in FIG. 4A. In the same way, in FIG. 4B, cushioning material 19 is provided in first protrusion 15 of permanent magnet embedding hole 12.

These cushioning materials 18 and 19 are made of so-called elastomer which is highly resilient synthetic resin or synthetic rubber. Cross sections of cushioning materials 18 and 19 before being inserted into first protrusion 15 or second protrusion 16 are set to be slightly larger than cross sections of the protrusions. Cushioning materials 18 and 19 are then compressed when they are inserted into the protrusions. The use of the cushioning material which has a larger cross section than that of the protrusion enables further reliable holding of permanent magnet 14 by pressing permanent magnet 14 against a side wall of permanent magnet embedding hole 12.

Cushioning materials 18 and 9 preferably have cylindrical cross sections, but other shapes are also applicable. In the description, cushioning material 18 or 19 is inserted into first protrusion 15 or second protrusion 16. However, the cushioning materials can be inserted into both protrusions.

The motor in the second exemplary embodiment as configured above prevents a risk of hitting the side wall of permanent magnet embedding hole 12 by permanent magnet 14. Cracking, chipping, and noise generation caused by permanent magnet 14 hitting the side wall of permanent magnet embedding hole 12 are thus preventable.

What is claimed is:

1. A motor comprising:
    a stator configured by winding a coil around a stator core, the stator core including a salient-pole core and a yoke; and
    a rotor including a rotor core made by laminating thin and highly permeable iron sheets, the rotor being rotatably held facing an inner peripheral face of the salient-pole core via a gap;
    wherein the rotor core has a plurality of permanent magnet embedding holes, a permanent magnet being embedded in and held stationary by each of the permanent magnet embedding holes absent adhesive;

a cross section of the permanent magnet is a rectangle with a long side in a rotating direction and a short side perpendicular to the long side;

a cross section of each of the permanent magnet embedding holes has an embedding hole's long side corresponding to the long side and an embedding hole's short side corresponding to the short side; and the embedding hole's short side has a first protrusion and a flat portion, and a second protrusion is provided on both ends of the embedding hole's long side to an inner diameter side so that a protruded whole shape of the second protrusion is disposed to be on a center side of the embedding hole from the flat portion.

2. The motor of claim 1, wherein the first protrusion is semicircular, protruding outward from the embedding hole's long side.

3. The motor of claim 1, wherein the second protrusion is semicircular, protruding to the inner diameter side at both ends of the embedding hole's long side.

4. The motor of claim 1, wherein the flat portion is provided between the first protrusion and the second protrusion, and is formed by a straight line perpendicular to the embedding hole's long side.

5. The motor of claim 1, wherein a ratio of a length of the flat portion to a length of the short side is from 0.2 to 0.6.

6. The motor of claim 1, wherein the permanent magnet is held in a state that the permanent magnet contacts the embedding hole's long side and the flat portion.

7. The motor of claim 1, wherein a cushioning material is provided in at least one of the first protrusion and the second protrusion.

8. The motor of claim 7, wherein the cushioning material is formed from one of resilient synthetic resin and resilient synthetic rubber.

9. The motor of claim 7, wherein the cushioning material is cylindrical.

* * * * *